United States Patent
Li et al.

(10) Patent No.: US 7,406,533 B2
(45) Date of Patent: *Jul. 29, 2008

(54) METHOD AND APPARATUS FOR TUNNELING DATA THROUGH A SINGLE PORT

(75) Inventors: Chia-Hsin Li, San Jose, CA (US); Steve Nelson, San Jose, CA (US); Wai Yim, Mountain View, CA (US)

(73) Assignee: Seiko Epson Corporation, Tokyo (JP)

( * ) Notice: Subject to any disclaimer, the term of this patent is extended or adjusted under 35 U.S.C. 154(b) by 933 days.

This patent is subject to a terminal disclaimer.

(21) Appl. No.: 10/681,523

(22) Filed: Oct. 8, 2003

(65) Prior Publication Data

US 2005/0080919 A1     Apr. 14, 2005

(51) Int. Cl.
G06F 15/16    (2006.01)
H04L 12/28    (2006.01)

(52) U.S. Cl. .................. 709/236; 709/223; 370/395.52
(58) Field of Classification Search ................. 709/236; 370/395.52
See application file for complete search history.

(56) References Cited

U.S. PATENT DOCUMENTS

| | | | |
|---|---|---|---|
| 5,958,053 | A | 9/1999 | Denker |
| 5,996,003 | A | 11/1999 | Namikata et al. |
| 6,018,530 | A | 1/2000 | Chakravorty |
| 6,226,680 | B1 | 5/2001 | Boucher et al. |
| 6,310,892 | B1 | 10/2001 | Olkin |
| 6,338,131 | B1 | 1/2002 | Dillon |
| 6,360,265 | B1 | 3/2002 | Falck et al. |
| 6,424,626 | B1 | 7/2002 | Kidambi et al. |
| 6,438,105 | B1 * | 8/2002 | Qarni et al. ................. 370/231 |
| 6,470,020 | B1 | 10/2002 | Barker et al. |
| 6,976,205 | B1 * | 12/2005 | Ziai et al. ................. 714/807 |
| 6,977,896 | B1 * | 12/2005 | Kobayashi ................. 370/235 |
| 7,073,196 | B1 | 7/2006 | Dowd |
| 2001/0056492 | A1 * | 12/2001 | Bressoud et al. ............ 709/227 |

(Continued)

FOREIGN PATENT DOCUMENTS

JP    11-234270    8/1999

(Continued)

OTHER PUBLICATIONS

Danzeisen et al.; "Access of Mobile IP users to Firewall protected VPNs"; http://www.iam.unibe.ch/~rvs/publications/secmip_gi.pdf; Aug. 7, 2003.*

(Continued)

*Primary Examiner*—Jason Cardone
*Assistant Examiner*—Lin Liu

(57) ABSTRACT

A communication protocol stack for enabling multimedia communication between communicating devices where multiple port communication data is tunneled through a single TCP port is provided. The communication protocol stack includes, at an application level, the capability to identify whether received communication data is for a communication port. If the received communication data is for the communication port, then the communication protocol stack includes the ability to forward identification data regarding the received communication data to a table in advance of forwarding the received communication data to a driver level of the communication protocol stack. A method, computer readable medium, and system for tunneling port traffic through a single HTTP port are also provided.

26 Claims, 9 Drawing Sheets

U.S. PATENT DOCUMENTS

| | | |
|---|---|---|
| 2002/0010938 A1 | 1/2002 | Zhang et al. |
| 2002/0042832 A1 | 4/2002 | Fallentine et al. |
| 2002/0085561 A1 | 7/2002 | Choi et al. |
| 2002/0091831 A1 | 7/2002 | Johnson |
| 2002/0124095 A1 | 9/2002 | Sultan |
| 2002/0133549 A1 | 9/2002 | Warrier et al. |
| 2002/0147826 A1 | 10/2002 | Sultan |
| 2002/0152325 A1 | 10/2002 | Elgebaly et al. |
| 2002/0156903 A1 | 10/2002 | Bach Corneliussen |
| 2002/0184390 A1 | 12/2002 | Alkhatib |
| 2003/0009571 A1* | 1/2003 | Bavadekar .................. 709/230 |
| 2003/0048780 A1 | 3/2003 | Phomsopha |
| 2003/0172301 A1 | 9/2003 | Judge et al. |
| 2004/0029555 A1* | 2/2004 | Tsai et al. ................... 455/403 |
| 2004/0088571 A1 | 5/2004 | Jerrim et al. |
| 2004/0098619 A1 | 5/2004 | Shay |
| 2004/0122917 A1 | 6/2004 | Menon et al. |
| 2005/0044146 A1 | 2/2005 | Nassor et al. |
| 2005/0108323 A1 | 5/2005 | Taylor et al. |
| 2005/0182821 A1 | 8/2005 | Chan et al. |
| 2006/0053194 A1 | 3/2006 | Schneider et al. |
| 2006/0089994 A1 | 4/2006 | Hayes |
| 2006/0168321 A1* | 7/2006 | Eisenberg et al. ........... 709/238 |
| 2006/0195532 A1 | 8/2006 | Zlateff et al. |
| 2007/0086454 A1 | 4/2007 | Grinfeld |
| 2007/0118665 A1* | 5/2007 | Philbrick et al. ............ 709/230 |

FOREIGN PATENT DOCUMENTS

| | | |
|---|---|---|
| JP | 2000-099428 | 4/2000 |
| JP | 2000-172597 | 6/2000 |
| JP | 2001-77865 | 3/2001 |
| JP | 2002-132597 | 5/2002 |
| JP | 2004-064490 | 2/2004 |
| WO | WO 98/34384 | 8/1998 |
| WO | WO 02/071717 | 9/2002 |

OTHER PUBLICATIONS

"Ridgeway Systems H.323 Firewall/NAT Problem Fix", oldwww.internet2.edu/commons/html/h232-firewall-nat.html, 2003.

B. Goode, "Voice Over Internet Protocol (VoIP)," *Proceedings of the IEEE*, vol. 90, No. 9, Sep. 2002, pp. 1495-1517.

"How to Establish NetMeeting Connections Through A Firewall" support.Microsoft.com, May 2000.

Victor Paulsamy et al., "Network Convergence and the NAT/Firewall Problems", *Proceedings of the 36th Hawaii International Conference on System Sciences (HICSS '03), 2002 IEEE*.

Bakre et al., "Implementation and Performance Evaluation of Indirect TCP", *IEEE Transactions on Computers*, vol. 46, No. 3, Mar. 1997, pp. 260-278.

Balakrishnan et al., "Improving TCP/IP Performance over Wireless Networks", *Proceedings of the First Annual International Conference on Mobile Computing and Networking*, 1995, pp. 2-11.

EPSON, EPSON 1000 ICS, Apr. 2002, p. 2.

* cited by examiner

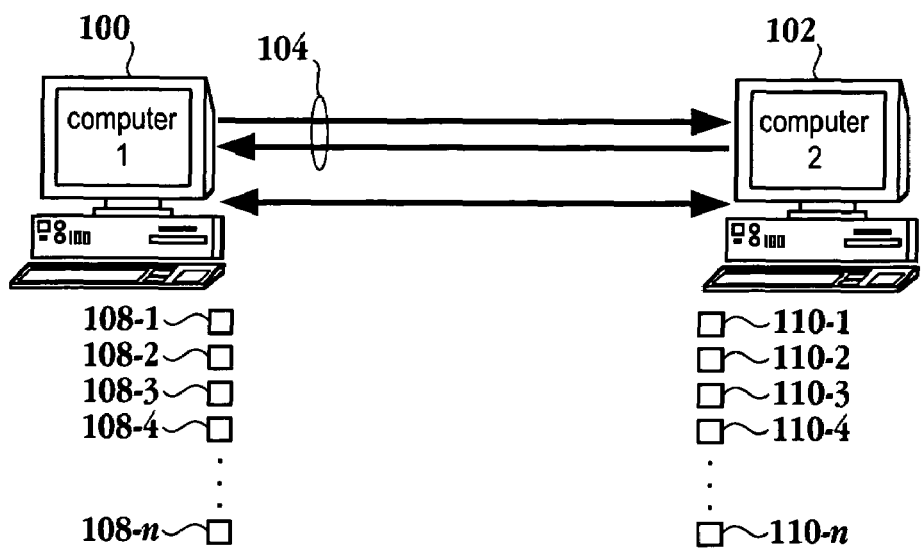
Fig. 1 *(prior art)*
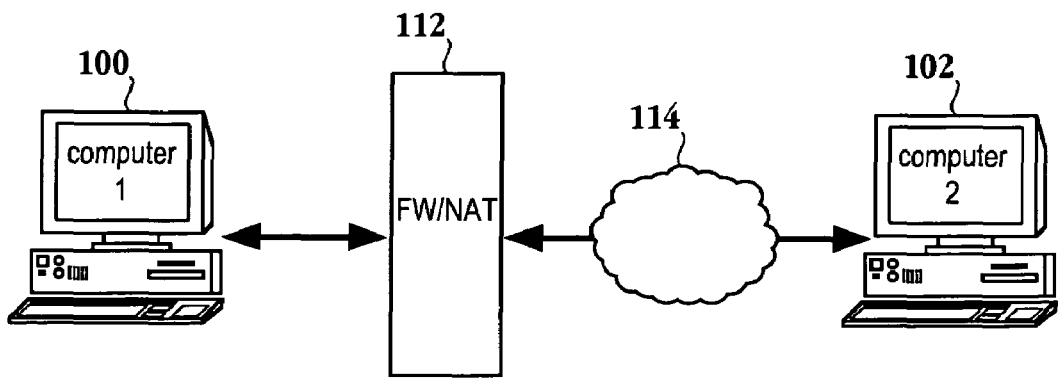
Fig. 2 *(prior art)*

METHOD AND APPARATUS FOR TUNNELING DATA THROUGH A SINGLE PORT

BACKGROUND OF THE INVENTION

The present invention relates generally to the transmission of information across the Internet, and more specifically to methods, systems, and apparatus for rapid, real-time transmission of information across the Internet and within networks and networked systems.

Many Internet based applications require real-time transmission and exchange of data for effective implementation. By way of example, H323 Internet video conferencing provides rapid, real time data exchange to present video and audio data for participants in local and remote settings. Typically, to realize the benefits of necessary real-time data exchange, data is transmitted over unreliable User Datagram Protocol/Internet Protocol (UDP/IP). The advantage of using the unreliable UDP over the reliable Transmission Control Protocol (TCP, also TCP/IP) is primarily an advantage of speed. UDP has less overhead since it does not transmit packet acknowledgement, packet verification, packet re-transmission, etc. In real time media transmission and play-back, such transmissions and verification processes negatively impact the system performance.

TCP serves as essentially the standard for most Internet data transmission. TCP maintains the highest degree of reliability by ensuring all data is received, received in the correct order, and that the data received is accurate and consistent with the data that was transmitted. In many applications, such reliability is paramount for effective data transmission. The highest degree of reliability, however, is not necessary for applications such as H323 Internet video conferencing, where speed is paramount. Most video-conferencing applications can easily compensate for occasionally missed audio data, which is generally imperceptible, and similarly, occasionally missed or garbled video data is generally easily tolerated and of little hindrance to video conferencing sessions.

FIG. 1 is a simplified schematic diagram of computers exchanging information without a firewall. Computers 100 and 102 establish a TCP connection after exchanging handshake signals 104. With reference to a videoconferencing standards, e.g., H323, multiple UDP port numbers are established for communication of the audio and video data. At least 4 UDP ports, 108-1 through 108-4 and 110-1 and 110-4, for each of computers 100 and 102, respectively, are opened for the audio and video control/data signals. Typically more than four ports are opened for each of computers 100 and 102 as illustrated by ports 108*n* and 110*n*.

However, many office and home networks are protected through firewalls. As is generally known, firewalls are designed to keep out unwanted Internet Protocol (IP) traffic from a network by restricting the number of ports being unblocked. This creates a problem for videoconferencing standards as the videoconferencing standards require a large number of TCP and UDP ports are required to be unblocked. FIG. 2 is a simplified schematic diagram of two computers communicating through a firewall. Here, computer 100 is behind firewall 112 and computer 102 communicates with the firewall over network 114. As mentioned above, firewall 112 does not allow the multiple port opening required by a UDP connection. Furthermore, since firewall 112 limits the ports being unblocked, the firewall will not recognize any UDP ports, such as UDP port numbers 1024-65,538, all of which may be used for a videoconference application.

When rapid, real-time transmission is desired, a firewall can and often does limit or prevent desired video conferencing capability. If a particular firewall blocks or denies all incoming Internet traffic except TCP/IP, videoconferencing or any other data exchange, must be conducted using highly reliable, but much slower, TCP/IP, or some work-around must be established to conduct UDP data transmission and exchange. One attempt to address this shortcoming is the use of a TCP/IP connection for the data. However, the TCP connection results in poor quality video due to the retransmission of missed packets, i.e., the reliability characteristics of the TCP connection.

In view of the foregoing, what is needed is a method and system of communicating videoconference data through existing firewalls with minimal impact of the audio/video data or system administrator's administration.

SUMMARY OF THE INVENTION

Broadly speaking, the present invention fills these needs by providing a method and communication protocol for tunneling data through a single HTTP port in order to pass through a firewall configured to limit the number of unblocked ports for transmitting data. The present invention can be implemented in numerous ways, including as a process, an apparatus, a system, a device, a method, a communication protocol or a computer readable media. Several embodiments of the present invention are described below.

In one embodiment, a method for tunneling data associated with a packet based multimedia communication standard is provided. The method initiates with intercepting a library call associated with the multimedia communication standard. Then, identification data associated with the library call is registered. Next, a Transmission Control Protocol/Internet Protocol (TCP/IP) header is added over a pre-existing header of a data packet related to the identification data. Then, the data packet having the (TCP/IP) header is transmitted through a firewall.

In another embodiment, a method for communicating port traffic through a single Hypertext Transfer Protocol (HTTP) port is provided. The method initiates with establishing a connection between a first and second computing device. Then, allocation data associated with the port traffic is transmitted to a tunneling driver. Next, the port traffic is segmented into datagrams. Then, the TCP/IP stack appends a first header to each one of the datagrams. Next, a Transmission Control Protocol/Internet Protocol (TCP/IP) header is appended over the first header, wherein the TCP/IP header is configured to direct each one of the datagrams to the single HTTP port.

In a further embodiment, a computer readable medium having program instructions for tunneling data associated with a packet based multimedia communication standard is provided. The computer readable medium includes program instructions for intercepting a library call associated with the multimedia communication standard. Program instructions for registering identification data associated with the library call and program instructions for adding a Transmission Control Protocol/Internet Protocol (TCP/IP) header over a pre-existing header of a data packet related to the identification data are provided. Program instructions for transmitting the data packet having the (TCP/IP) header through a firewall are included.

In yet another embodiment, a computer readable medium having program instructions for communicating port traffic through a single Hypertext Transfer Protocol (HTTP) port is provided. The computer readable medium includes program instructions for establishing a connection between a first and second computing device and program instructions for transmitting allocation data associated with the port traffic to a tunneling driver. Program instructions for segmenting the port traffic into datagrams and program instructions for appending a first header to each one of the datagrams are included. Program instructions for appending a Transmission Control Protocol/Internet Protocol (TCP/IP) header over the first header are included, wherein the TCP/IP header is configured to direct each one of the datagrams to the single HTTP port.

In still yet another embodiment, a system for tunneling port traffic destined for multiple ports through a single port is provided. The system includes a server configured to transmit data packets each having a tunneling header in addition to a packet header. A firewall limiting a number of unblocked ports to the single port is included. The firewall is capable of analyzing the tunneling header, wherein the tunneling header is associated with the single port so that the firewall allows the data packets to pass through. A client configured to receive the data packets from the firewall through the single port is included. The client is further configured to identify a flag and a checksum associated with the tunneling header in order to strip the tunneling header for access to the packet header.

In yet another embodiment, a communication protocol stack for enabling multimedia communication between communicating devices is provided. The communication protocol stack includes, at an application level, the capability to identify whether received communication data is for a communication port. If the received communication data is for the communication port, then the communication protocol stack includes the ability to forward identification data regarding the received communication data to a table in advance of forwarding the received communication data to a driver level of the communication protocol stack.

Other advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

FIG. 1 is a simplified schematic diagram of computers exchanging information without a firewall.

FIG. 2 is a simplified schematic diagram of two computers communicating through a firewall.

DETAILED DESCRIPTION OF THE PREFERRED EMBODIMENTS

An invention for a communication protocol, method and system for tunneling data for multiple TCP/UDP ports through a single TCP port for passage through a firewall is provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention. FIGS. 1 and 2 are described in the "Background of the Invention" section.

Due to security concerns, the firewall is an essential component of most systems and networks with Internet access, and is a valuable tool for safeguarding data and maintaining system integrity. However, increased security impacts the data exchange speed. While every firewall has its own characteristic methods for establishing and maintaining a desired level of security, it is common for firewalls to deny or block access to all but Transmission Control Protocol/Internet Protocol (TCP/IP) transmission, or to designate only certain ports or a range of ports for UDP data exchange. The embodiments discussed herein provide a scheme for tunneling data associated with a multimedia teleconferencing standard, e.g., H323, SIP or any other suitable packet based standard, through a single HTTP port. Through the combination of proxy socket library calls and a kernel mode device driver that is inserted in the operating system (OS) TCP/IP stack, the existing multimedia teleconferencing applications require minimal code modification. As will be explained below, the tunneling driver is sandwiched between the TCP/IP driver and a network interface card (NIC) driver. Thus, the IP datagram transformation discussed below is hidden from both drivers. Consequently, the TCP/IP driver and the NIC driver function as though there is not another driver between them.

Figure 3:
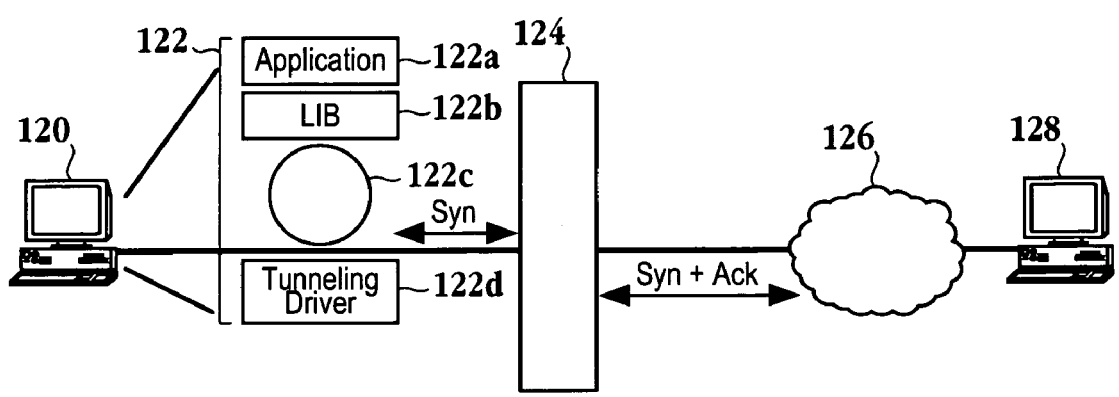
FIG. 3 is a simplified schematic diagram of a system that includes a modified application module stack which may be integrated with a connectionless transmission control protocol scheme in order to provide both an unreliable and reliable connection capability in accordance with one embodiment of the invention.

FIG. 3 is a simplified schematic diagram of a system that includes a modified application module stack which may be integrated with a connectionless transmission control protocol scheme in order to provide both an unreliable and reliable connection capability in accordance with one embodiment of the invention. Client 120 sits behind firewall 124. Server 128 communicates with client 120 through network 126 and firewall 124. With respect to a multi-media teleconferencing application, e.g., H323 application, two types of connections are required. That is, reliable connections are required for call set up and call control data, while unreliable connections are required for transmitting media data, like audio and video where data throughput is crucial. However, in order to provide reliable connections over the connectionless TCP connection, much of the packet retransmission, packet re-ordering and packet receive notification mechanism which are implemented in the TCP/IP stack that comes standard with most of the modern operating systems, i.e., MICROSOFT WINDOWS, LINUX, etc. Thus, modified protocol stack 122 is capable of providing a communication in which reliable and unreliable connections may be made for a teleconferencing application. As will be explained in more detail with reference to FIGS. 4A and 4B, the modified application stack includes the application 122a, a dynamic link library (dll) 122b, other libraries and drivers 122c, and tunneling driver 122d. Of course, module stack 122 sits over hardware such as a network card.

When the video conferencing application makes a TCP or UDP connection, the protocol and the port number will be sent to the tunneling driver in advance of the actual data transmission on those ports. At this time, when the tunneling driver receives IP datagrams from the TCP/IP stack driver, the tunneling driver will examine the IP datagram's protocol and port number to see if the IP datagram requires modification. If so, it will append a predefined IP and TCP header (40 bytes total) to the original IP datagram's IP header. In this new IP/TCP header, the IP identification is incremental for each datagram translated. In addition, the TCP header flag is always set as SYN for when the client initiates the connection from behind the firewall, and SYN+ACK for server responses back to the client's connection request, i.e., from outside of the firewall. In this approach, the tunneling driver will not need to wait for a full stateful TCP connection to setup at the firewall. This configuration will provide the perception to the firewall that there is always a client trying to request a connection to a host outside of the firewall. As a result, the tunneling driver is stateless in this respect.

On the receiving side, once the tunneling driver determines that the IP datagram is modified for the current purpose, it will strip the appended IP and TCP header from the IP datagram and recovers the original IP datagram. The advantage of this approach is that the tunneling driver makes the IP datagram appear as a TCP datagram, as a result the datagram can pass through the firewall. Therefore, there is no need to add the retransmission, packet re-ordering, and other typical reliable TCP connection features that is not needed in a UDP communication. In this case, the UDP datagram will be disguised as a TCP datagram on the sender side. Then the receiver will remove the tunneling TCP/IP header to recover the original UDP datagram (including the original IP header). This original UDP datagram will then be passed to the TCP/IP driver for further processing. As a result, no retransmission, or re-ordering occurs.

Figure 4A:
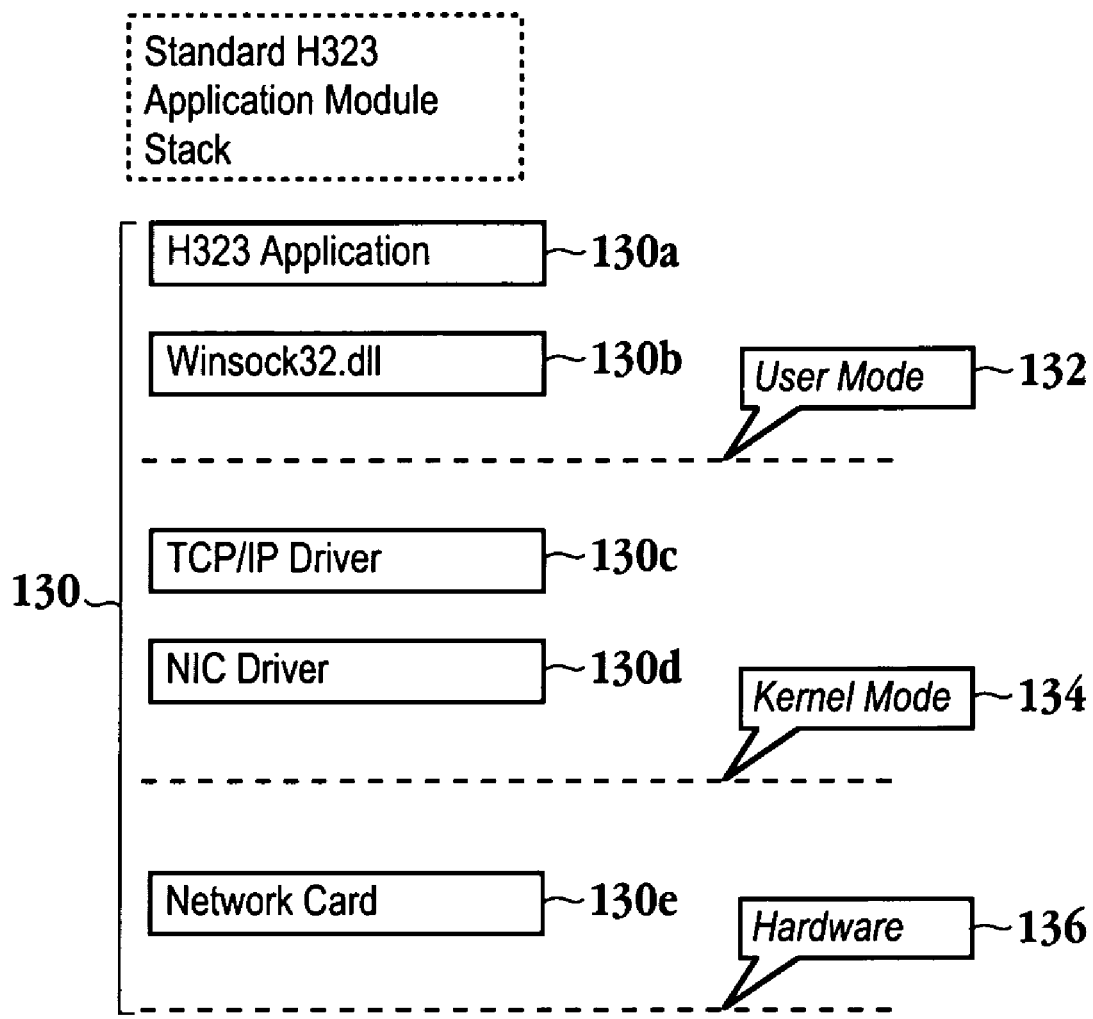
FIG. 4A is a simplified schematic diagram illustrating the module stack for a standard H323 application module.

FIG. 4A is a simplified schematic diagram illustrating the module stack for a standard H323 application module. Module stack 130 includes H323 application 130a which sits above Winsock32.dll 130b. As is generally known, Winsock32.dll is a dynamic link library which is a collection of small programs, any of which may be called when needed by a larger program that is running on the computer. H323 application 130a and Winsock32.dll 130b sit at the application level or user mode 132. In kernel mode 134, also referred to as the driver level, TCP/IP driver module 130c sits over network interface card (NIC) driver module 130d. At hardware level 136 is network card 130e.

Figure 4B:
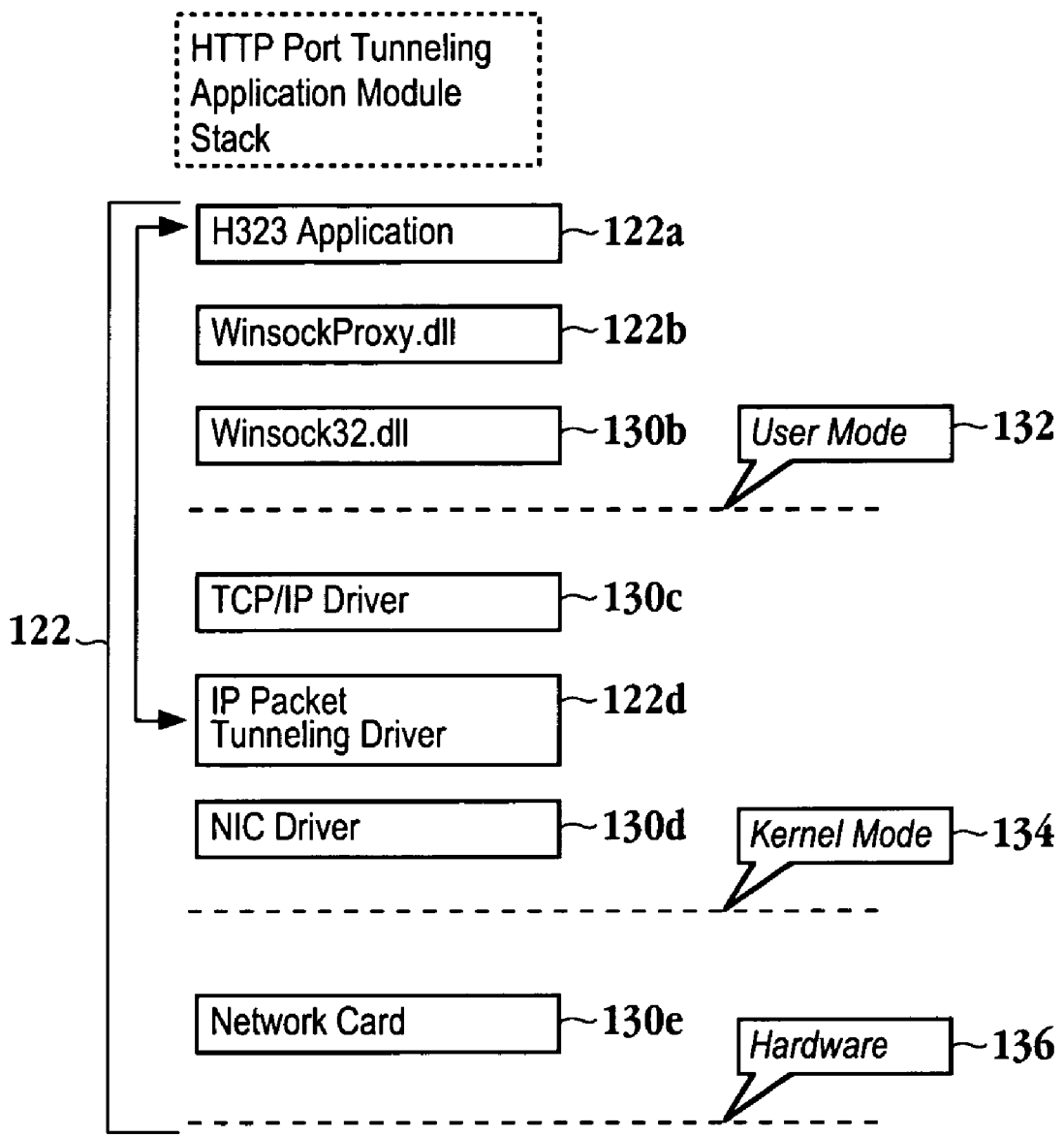
FIG. 4B is a simplified schematic diagram illustrating a port tunneling application module stack in accordance with one embodiment of the invention.
Figure 6A:
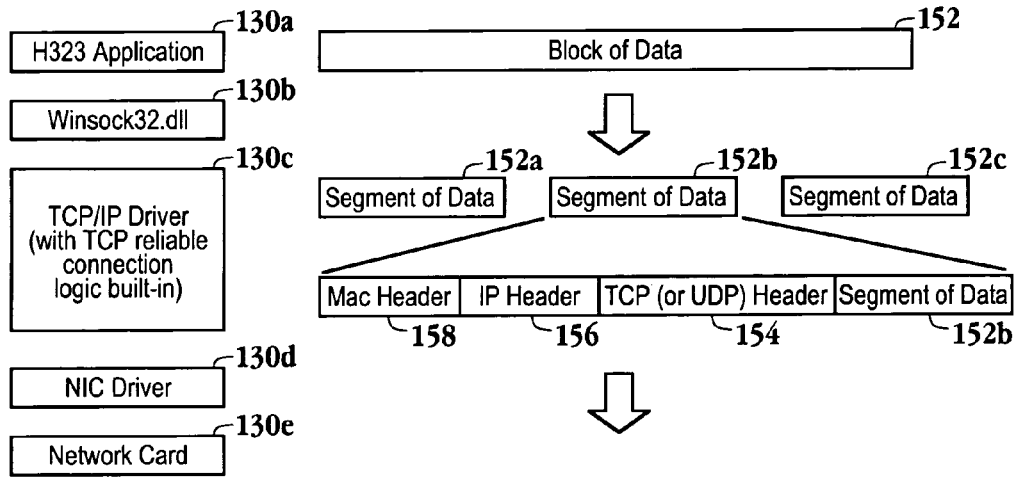
FIG. 6A illustrates the segmentation of an incoming block of data through the standard TCP/UDP/IP application module stack.
Figure 6B:
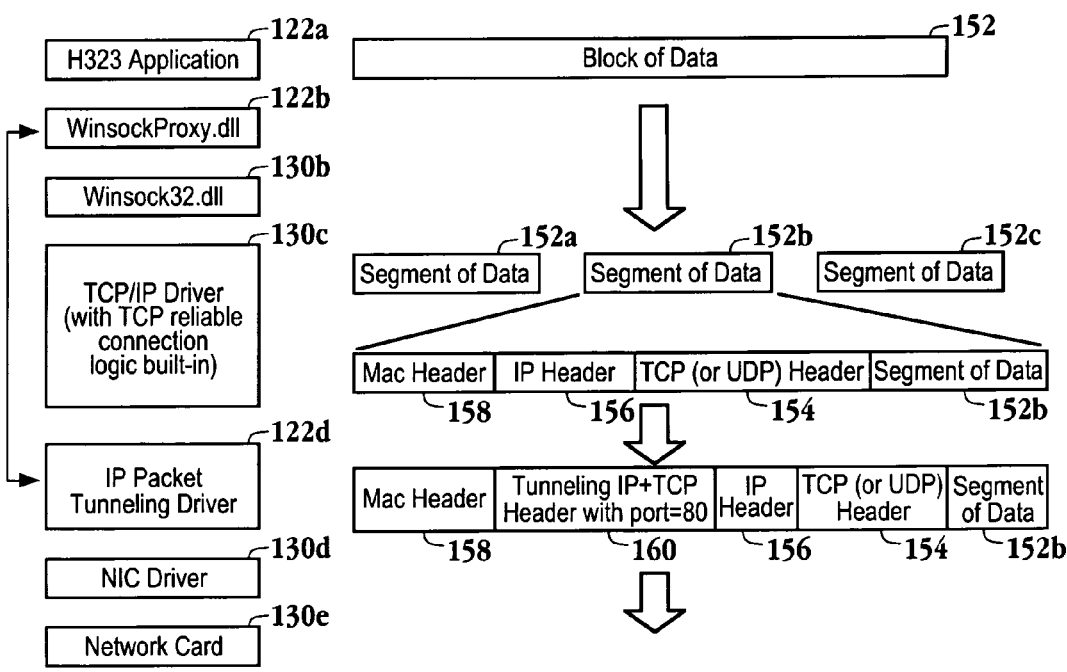
FIG. 6B illustrates the segmentation and the header addition for the modified application module stack to enable tunneling of the data through a firewall in accordance with one embodiment of the invention.

FIG. 4B is a simplified schematic diagram illustrating a port tunneling application module stack in accordance with one embodiment of the invention. The port tunneling application module stack includes an extra module at the application level and an extra module at the driver level as will be explained further below. Here, application module 122a, which may be any suitable multimedia teleconferencing application, sits above Winsockproxy.dll 122b. Application module 122a links with Winsockproxy.dll 122b. Whenever application module 122a makes a standard socket library call, e.g., bind( ), connect( ), and closesocket( ), Winsockproxy.dll 122b intercepts the calls and communicates with IP packet tunneling driver 122d in order to register/de-register a port number and protocol type that the application module allocates. Thus, in advance of sending communication data from the application level through Winsock32.dll module 130b to the driver level, Winsockproxy.dll module 122b communicates with tunneling driver 122d. The communication data is passed from Winsockproxy.dll 122b to Winsock32.dll 130b, and eventually to the driver level, or kernel mode 134, where TCP/IP driver 130c initially receives the data. The TCP/IP driver then breaks up the data into packets, or segments, of appropriate size, also referred to as datagrams, as illustrated in FIGS. 6A and 6B. In addition, the TCP/IP driver appends the appropriate media access control (MAC), IP and TCP (or UDP) headers to the datagrams depending on the socket type. TCP/IP driver 130c passes the packets to IP packet tunneling driver 122d. Packet tunneling driver 122d checks the TCP/UDP port and determines if the port is on the registered port number and protocol type list.

It should be appreciated the communication previously from Winsockproxy.dll module 122b will register the port number and protocol type. If the port number and protocol type are on the list, tunneling driver 122d inserts a 40 byte tunneling IP+TCP header to the datagram, as illustrated with reference to FIG. 6B. In addition, tunneling driver 122d checks the destination IP of the datagram. If the destination IP is on the firewall IP mapping table, then tunneling driver 122d replaces the destination IP and port number in the tunneling IP+TCP header to the firewall IP and firewall port. Thereafter, a checksum is recalculated for the datagram before sending it to NIC driver 130d. Subsequently, the data is sent from NIC driver 130d to a network card 130e at hardware level 136. When the H323 application exits or is done with a session, it calls closesocket( ) function for each TCP or UDP socket the application has opened during the session. The WinsockProxy.dll library intercepts this closesocket( ) function call, and passes the information to the Tunneling driver. The Tunneling driver removes the corresponding port and protocol information from its table and also cleans up any firewall IP and firewall port mapping if necessary.

Figure 5:
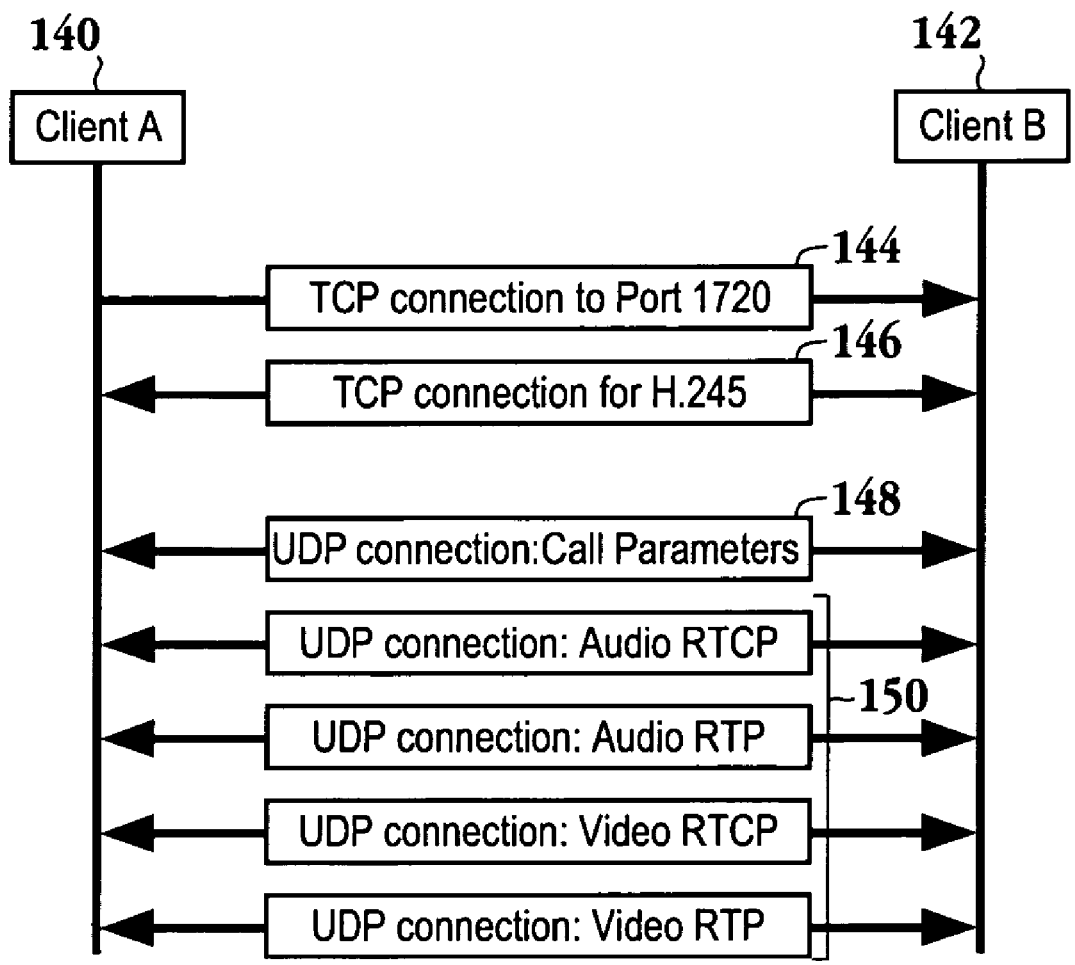
FIG. 5 is a simplified schematic diagram illustrating a typical H323 TCP/UDP connection sequence and the number or types of IP connections involved.

FIG. 5 is a simplified schematic diagram illustrating a typical H323 TCP/UDP connection sequence. Here, H323 application makes a TCP/IP connection to another H323 application that is listening on TCP port 1720. For example, client A 140 requests a TCP connection to port 1720 through transmission 144 to client B 142. Call setup and call control transmissions 144, 146, and 148 proceed over reliable connections. Then, in subsequent data exchange, both applications may open up more TCP and UDP ports for control data and media data transmission, as illustrated by modules 150. Thus, with reference to FIG. 4A, the H323 application writes data into an open socket (either TCP or UDP) socket, and the Winsock32.dll module passes this data to the TCP/IP driver.

FIG. 6A illustrates the segmentation of an incoming block of data through the standard application module stack. Here, incoming block of data 152 is segmented into segments of data represented by blocks 152a through 152c. As can be seen, the standard application module stack passes incoming block of data 152 through Winsock32.dll 130d to TCP/IP driver 130c which segments the data. In addition, a header is added to each segment of data. Thus, as illustrated, segment of data 152*b* includes a header having a TCP (or UDP) header 154, IP header 156 and MAC header 158.

FIG. 6B illustrates the segmentation and the header addition for the modified application module stack to enable tunneling of the data through a firewall in accordance with one embodiment of the invention. Incoming block of data 152 is segmented to data segments 152*a* through 152*c*. Each of the data segments has a header added to this data segment as discussed above with reference to FIG. 6A. Thereafter, IP packet tunneling driver 122*d* takes each segment of data having the header and adds a tunneling header. As illustrated, segment of data 152*b* includes TCP (or UDP) header 154, IP header 156 and tunneling IP+TCP header 160, which has been inserted between MAC header 158 and IP header 156. In one embodiment, tunneling header 160 is a 40 byte header that indicates a specific Hypertext transfer protocol (HTTP) port number, e.g., port number 80, or any other well-known port such as 23 for telnet.

Figure 7:
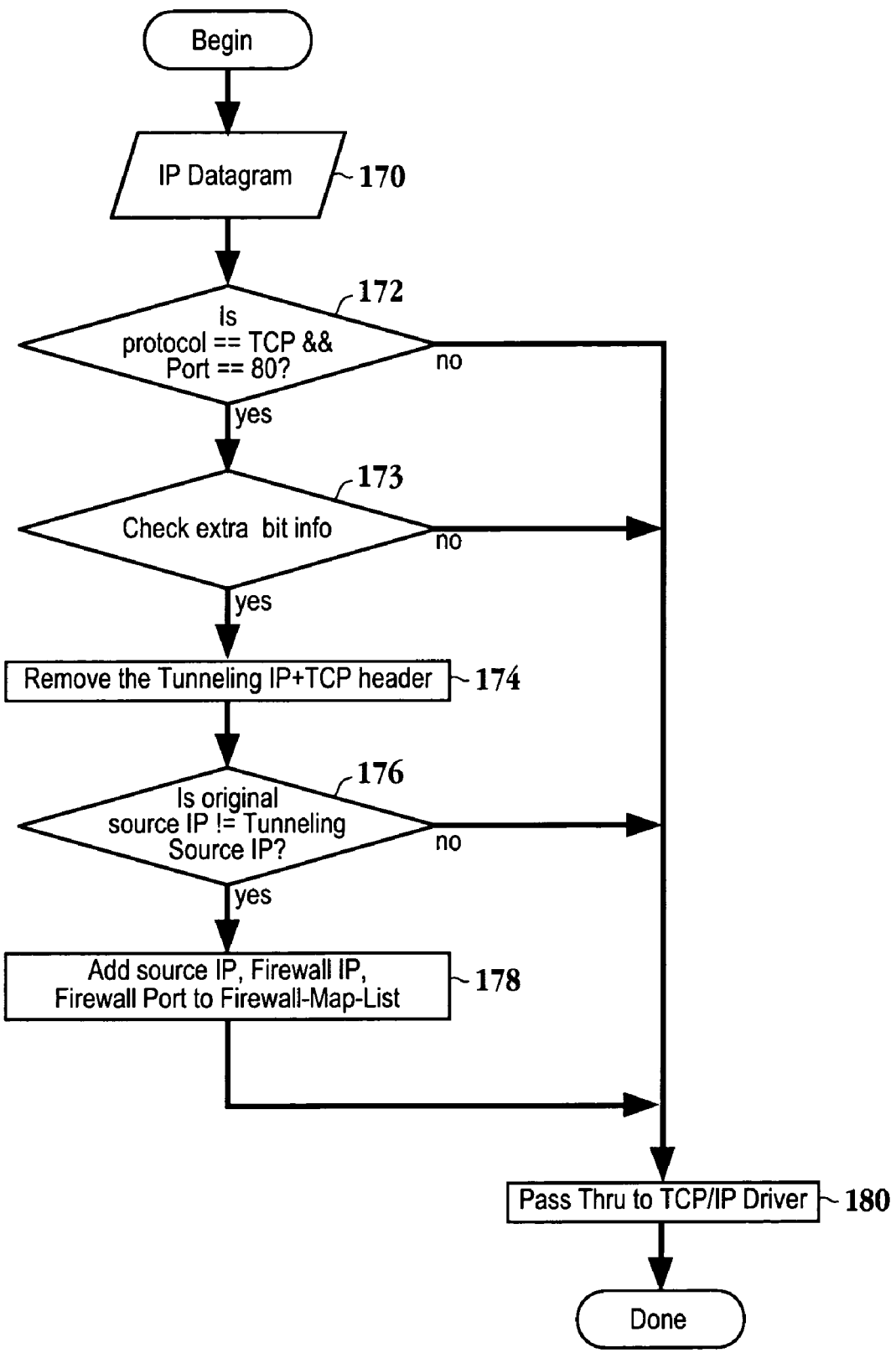
FIG. 7 is a flowchart diagram illustrating the method operations associated with a tunneling driver receiving a datagram from a network interface card in accordance with one embodiment of the invention.

FIG. 7 is a flowchart diagram illustrating the method operations associated with a tunneling driver receiving a datagram from a network interface card in accordance with one embodiment of the invention. IP datagram 170 is checked to determine the datagram's IP type and port number in decision operation 172. If the datagram's protocol type is TCP and the port number is 80 (or another suitable predefined HTTP port), then the tunneling driver performs an extra bit information check in decision operation 173. Further details with reference to the checking of the extra bit information may be found in U.S. patent application Ser. No. 10/681,732, issued as U.S. Pat. No. 7,263,071, entitled "Connectionless TCP/IP Data Exchange", which is incorporated by reference herein. If the datagram passes the check in decision operation 173, i.e., the protocol type is TCP and the port is port 80 (or the predefined port), then the tunneling header is removed in operation 174. The source IP address of the tunneling header is compared with the original source IP address, if the source IP address and the original source IP address are different, then the datagram is passed through a firewall/NAT server. Here, the tunneling driver records the original IP address to firewall IP address and port number mapping as illustrated in operation 178. The datagram is then passed through to the TCP/IP driver in operation 180. In decision operation 172, if the protocol does not equal the TCP and/or the port number is not equal to port 80, then the datagram is passed through to the TCP/IP driver in operation 180. Here, the datagram is handled through the standard mechanism. Similarly, in decision operation 173 if the extra bit information does not check, the datagram is passed through to the TCP/IP driver in operation 180. Likewise if the original source IP equals the tunneling source IP in decision operation 176, then the datagram is passed through to the TCP/IP driver in operation 180 since there is no firewall IP and original IP translation required for the connection.

Figure 8:
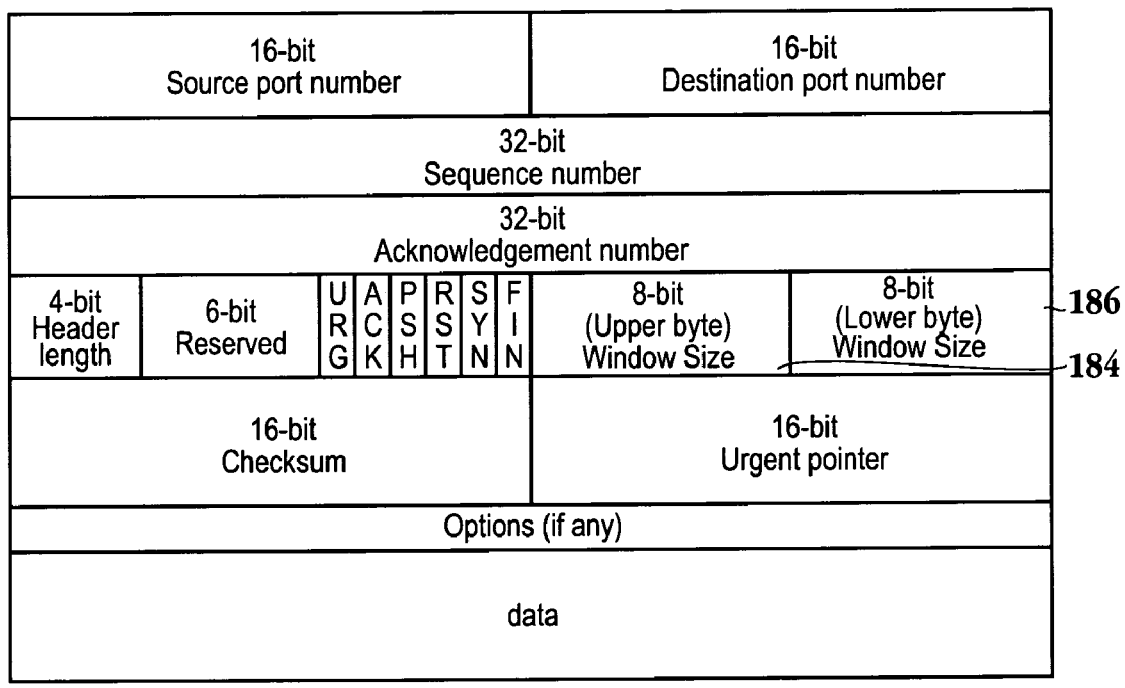
FIG. 8 is a simplified schematic diagram of a connectionless TCP header in accordance with one embodiment of the present invention.

FIG. 8 is a simplified schematic diagram of a connectionless TCP header in accordance with one embodiment of the present invention. The connectionless TCP header 182 is similar to a regular TCP header, with the window size field being modified. The widow size field has been subdivided into upper byte section 184 and lower byte section 186. In one embodiment of the invention, a checksum is written to upper byte 184 of the window size field, and a pre-defined value is written to lower byte 186 of the window size field. The pre-defined value and the checksum identify the datagram as a connectionless TCP/IP datagram. That is, the pre-defined value written to lower byte 186 of the window size field identifies the datagram as a connectionless TCP/IP transmission, differentiating the datagram from standard TCP/IP transmissions. In addition to the pre-defined value in lower byte 186 of the window size field, upper byte 184 of the window size field carries a special checksum to verify and confirm that the datagram is a connectionless TCP/IP datagram. In one embodiment, if the pre-defined value in lower byte 184 of the window size field identifies the received packet as a connectionless TCP/IP datagram, and the checksum in upper byte 186 of the window size field of a connectionless TCP/IP header validates the identification, the datagram will be treated and processed as a connectionless TCP/IP transmission. Further details on the configuration of the connectionless TCP header may be found in U.S. patent application Ser. No. 10/681,732, issued as U.S. Pat. No. 7,263,071, which has been incorporated by reference.

Figure 9:
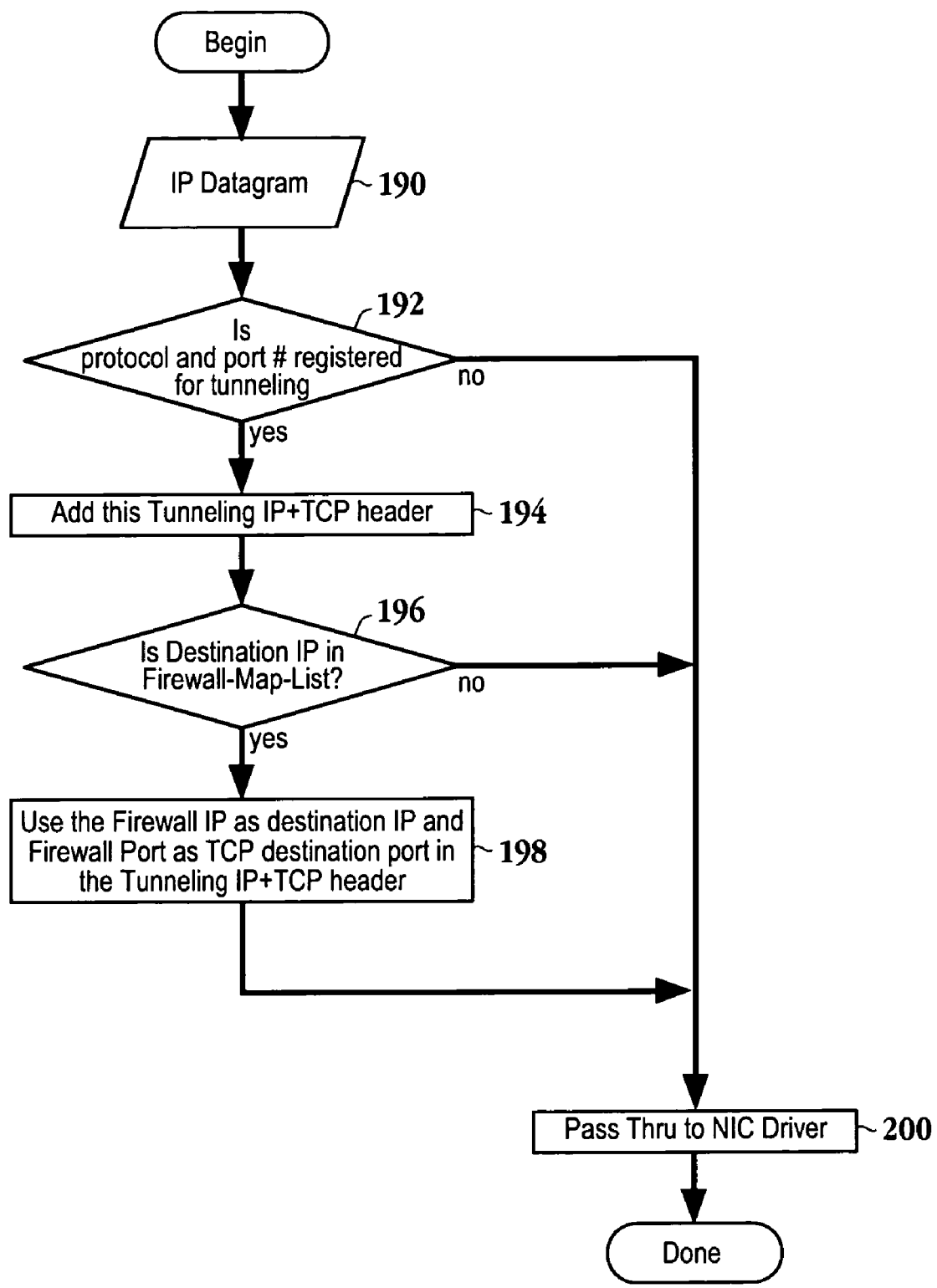
FIG. 9 is a flowchart diagram illustrating the method operations associated with a tunneling driver receiving a datagram from a TCP/IP driver in accordance with one embodiment of the invention.

FIG. 9 is a flowchart diagram illustrating the method operations associated with a tunneling driver receiving a datagram from a TCP/IP driver in accordance with one embodiment of the invention. Here, the tunneling driver receives datagram 190 from the TCP/IP driver as illustrated with reference to FIGS. 4B and 6B. The tunneling driver then checks the TCP/UDP port number and determines if the port number is on the registered port number and protocol type list in decision operation 192. It should be appreciated that the Winsock-Praoxy.dll module discussed with reference to FIGS. 4B and 6B intercepts socket library calls and communicates data associated with these calls to the tunneling driver. The tunneling driver is then capable of registering/de-registering the port number and protocol type associated with the intercepted calls. If the port number and protocol type are on the list, the tunneling driver inserts the 40 byte tunneling header into the datagram in operation 194. In decision operation 196, it is determined whether the destination IP is in the firewall mapping table. If the destination IP is in the firewall IP mapping table, the tunneling driver replaces the destination IP and port number in the tunneling header with the firewall IP and firewall port number in operation 198. Thereafter, the checksum is recalculated for the datagram before sending the datagram to the NIC driver in operation 200.

In summary, embodiments of the present invention enable the tunneling of TCP and UDP connections into a single TCP connection on an HTTP port, such as for example, HTTP port 80. Thus, a packet based multimedia conferencing application may successfully pass through a firewall protecting a client or receiver of the multimedia data. The addition of two modules, i.e., WinsockProxy.dll and the tunneling driver described above, into the application module stack will achieve the functionality described herein. As described above, modifying the teleconferencing application to link to the WinsockProxy.dll module, rather than the Winsock32.dll module, enables the simulation of all function calls before calling the Winsock32.dll. It should be appreciated that all of the reliable connection mechanism is maintained through the TCP/IP driver. In one embodiment, a connectionless TCP scheme may be accomplished through the tunneling embodiments described herein. Here, a UDP datagram is packaged in a connectionless TCP/IP header which appears essentially as a regular TCP/IP header and datagram. Upon receipt, the datagram is identified as a connectionless TCP/IP datagram, the connectionless TCP/IP header is stripped from the datagram, and the data is processed in accordance with the original or underlying protocol that remains after the connectionless TCP/IP header is removed. The connectionless TCP/IP header does not automatically initiate a response such as an acknowledgement, a verification, a request for re-transmission, and so forth. In one embodiment, the connectionless TCP/IP header enables transmission over the Internet and other networks that may prioritize or require the TCP/IP protocol. However, the identification of the datagram as a connectionless TCP/IP datagram results in the header being stripped from the underlying datagram and precludes traditional acknowledgement and other reliability data exchange. It should be appreciated that while the embodiments describe a client server relationship, this relationship is not meant to be limiting, as the relationship may be extended to any suitable receiver and sender of data.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A tangible computer readable storage medium having program instructions for communicating port traffic through a single Hypertext Transfer Protocol (HTTP) port, comprising:
   a) program instructions for establishing a connection between a first and second computing device;
   b) program instructions for transmitting allocation data associated with the port traffic to a tunneling driver;
   c) program instructions for segmenting the port traffic into datagrams;
   d) program instructions for appending a first header to each one of the datagrams; and
   e) program instructions for appending a Transmission Control Protocol/Internet Protocol (TCP/IP) header over the first header, the program instructions for appending a TCP/IP header including,
      program instructions for inserting a flag into a lower byte of a window size field of the TCP/IP header; and
      program instructions for inserting a checksum into an upper byte of the window size field of the TCP/IP header,
   wherein the TCP/IP header is configured to direct each one of the datagrams to the single HTTP port.

2. The tangible computer readable storage medium of claim 1, wherein the connection is a TCP connection and the single HTTP port is port 80.

3. The tangible computer readable storage medium of claim 1, wherein the program instructions for transmitting allocation data includes,
   program instructions for defining a port number and a protocol type associated with the port traffic.

4. The tangible computer readable storage medium of claim 1, wherein the first header is one of a TOP header and a User Datagram Protocol (UDP) header.

5. A method for communicating port traffic through a single Hypertext Transfer Protocol (HTTP) port, comprising:
   a) establishing a connection between a first and second computing device;
   b) transmitting allocation data associated with the port traffic to a tunneling driver;
   c) segmenting the port traffic into datagrams;
   d) appending a first header to each one of the datagrams; and
   e) appending a Transmission Control Protocol/Internet Protocol (TCP/IP) header over the first header, the method operation of appending a TCP/IP header including,
      inserting a flag into a lower byte of a window size field of the TCP/IP header; and
      inserting a checksum into an upper byte of the window size field of the TCP/IP header,
   wherein the TCP/IP header is configured to direct each one of the datagrams to the single HTTP port.

6. The method of claim 5, wherein the connection is a TCP connection and the single HTTP port is port 80.

7. The method of claim 5, wherein the method operation of transmitting allocation data includes,
   defining a port number and a protocol type associated with the port traffic.

8. The method of claim 5, further comprising:
   setting a SYN flag in the TCP/IP header for initiation of the connection from behind a firewall; and
   setting SYN+ACK flags in the TCP/IP header for responses to the initiation of the connection from outside of the firewall.

9. A tangible computer readable storage medium having program instructions for tunneling data associated with a packet based multimedia communication standard, comprising:
   program instructions for intercepting a library call associated with the multimedia communication standard;
   program instructions for registering identification data associated with the library call; program instructions for adding a Transmission Control Protocol/Internet Protocol (TCP/IP) header over a pre-existing header of a data packet related to the identification data, the program instructions for adding a TCP/IP header including,
      program instructions for inserting a flag into a lower byte of a window size field of the TCP/IP header; and
      program instructions for inserting a checksum into an upper byte of the window size field of the TCP/IP header; and
   program instructions for transmitting the data packet having the (TCP/IP) header through a firewall.

10. The tangible computer readable storage medium of claim 9, wherein the program instructions for operation of registering identification data associated with the library call includes,
   program instructions for checking if a port number and a protocol type are defined in a table; and program instructions for adding the port number and the protocol type to the table.

11. The tangible computer readable storage medium of claim 10, wherein the port number is port 80 and the protocol type is a TCP.

12. The tangible computer readable storage medium of claim 9, wherein the identification data includes a port number and a protocol type associated with the data packet.

13. The tangible computer readable storage medium of claim 9, wherein the program instructions for registering identification data associated with the library call are completed prior to advancing data associated with the library call from an application level of a protocol stack of the packet based multimedia communication standard to a driver level of the packet based multimedia communication standard.

14. A method for tunneling data associated with a packet based multimedia communication standard, comprising:
    intercepting a library call associated with the multimedia communication standard;
    registering identification data associated with the library call;
    adding a Transmission Control Protocol/Internet Protocol (TCP/IP) header over a pre-existing header of a data packet related to the identification data, the method operation of adding a TCP/IP header including,
        inserting a flag into a lower byte of a window size field of the TCP/IP header; and
        inserting a checksum into an upper byte of the window size field of the TCP/IP header; and
    transmitting the data packet having the (TCP/IP) header through a firewall.

15. The method of claim 14, wherein the method operation of registering identification data associated with the library call includes,
    checking if a port number and a protocol type are defined in a table;
    if the port number and the protocol type are not defined in the table, the method includes,
        adding the port number and the protocol type to the table.

16. The method of claim 15, wherein the port number is port 80 and the protocol type is a TCP.

17. The method of claim 14, wherein the identification data includes a port number and a protocol type associated with the data packet.

18. The method of claim 1, wherein the method operation of registering identification data associated with the library call is done prior to advancing data associated with the library call from an application level of a protocol stack of the packet based multimedia communication standard to a driver level of the packet based multimedia communication standard.

19. The method of claim 1, wherein the flag and checksum identify the data packet as a connectionless TCP/IP packet.

20. The method of claim 1, wherein the TCP/IP header flag is set as SYN if a client initiates a connection behind the firewall, and the TCP/IP header flag is set as SYN+ACK if a server responds back to the client.

21. A system for tunneling port traffic destined for multiple ports through a single port, comprising:
    a server configured to transmit data packets each having a tunneling header in addition to a packet header;
    a firewall limiting a number of unblocked TOP ports, the firewall capable of analyzing the tunneling header, wherein the tunneling header is associated with the single port so that the firewall allows the data packets to pass through; and
    a client configured to receive the data packets from the firewall through the single port, the client further configured to identify a flag and a checksum associated with the tunneling header in order to strip the tunneling header for access to the packet header, wherein the flag and the checksum are incorporated into a lower byte and a upper byte of a window size field of the tunneling header respectively.

22. The system of claim 21, wherein the packet header is a User Datagram Protocol (UDP) packet header.

23. The system of claim 21, wherein the single port is hypertext transfer protocol (HTTP) port 80.

24. A communication method utilizing protocol stack for enabling multimedia communication between communicating devices, comprising:
    at an application level, identifying whether received communication data is for a communication port; and
    if the received communication data is for the communication port, forwarding identification data regarding the received communication data to a table in advance of forwarding the received communication data to a driver level of the communication protocol stack, wherein a tunneling driver associated with the driver level inserts a tunneling header over a header of the communication data when the communication data is for the communication port, wherein the method operation of inserting a tunneling header includes,
        inserting a flag into a lower byte of a window size field of the tunneling header; and
        inserting a checksum into an upper byte of the window size field of the tunneling header.

25. The communication protocol stack of claim 24, further comprising:
    forwarding the communication data to the driver level; and
    checking whether the identification data associated with the communication data is listed in the table.

26. The communication protocol stack of claim 25, further comprising:
    incorporating a firewall Internet protocol address and a firewall port number into the tunneling header.

* * * * *

UNITED STATES PATENT AND TRADEMARK OFFICE
CERTIFICATE OF CORRECTION

PATENT NO.       : 7,406,533 B2                                              Page 1 of 1
APPLICATION NO.  : 10/681523
DATED            : July 29, 2008
INVENTOR(S)      : Chia-Hsin Li et al.

It is certified that error appears in the above-identified patent and that said Letters Patent is hereby corrected as shown below:

Column 12, line 7, please change "TOP" to --TCP--

Signed and Sealed this

Sixteenth Day of December, 2008

JON W. DUDAS
*Director of the United States Patent and Trademark Office*